(12) United States Patent
Baumann et al.

(10) Patent No.: US 8,465,586 B2
(45) Date of Patent: Jun. 18, 2013

(54) POLYSACCHARIDE DERIVATIVES HAVING AN ADJUSTED PARTICLE MORPHOLOGY FOR HYDROLYTICALLY SETTING COMPOSITIONS

(75) Inventors: Robert Baumann, Ruschlikon (CH); Yvonne Goerlach-Doht, Rosengarten (DE); Marco Grosstueck, Walsrode (DE); Juergen Hermanns, Nottensdorf (DE); Joerg Neubauer, Hamburg (DE)

(73) Assignee: Dow Global Technologies LLC, Midland, MI (US)

( * ) Notice: Subject to any disclaimer, the term of this patent is extended or adjusted under 35 U.S.C. 154(b) by 2 days.

(21) Appl. No.: 13/185,610

(22) Filed: Jul. 19, 2011

(65) Prior Publication Data
US 2012/0024199 A1 Feb. 2, 2012

Related U.S. Application Data

(60) Provisional application No. 61/368,297, filed on Jul. 28, 2010.

(51) Int. Cl.
*C04B 24/38* (2006.01)
(52) U.S. Cl.
USPC .......................................... 106/729; 106/730
(58) Field of Classification Search
USPC .............................................. 106/729, 730
See application file for complete search history.

(56) References Cited

U.S. PATENT DOCUMENTS

| | | | |
|---|---|---|---|
| 4,076,935 A | 2/1978 | Eichenseer et al. |
| 4,096,326 A | 6/1978 | Reid |
| 5,746,822 A | 5/1998 | Espinoza et al. |
| 6,320,043 B1 | 11/2001 | Weber et al. |
| 6,406,537 B1 | 6/2002 | Immordino |
| 6,755,908 B2 | 6/2004 | Sasage et al. |
| 6,943,247 B2 | 9/2005 | Kiesewetter et al. |
| 7,259,257 B2 | 8/2007 | Schlesiger et al. |
| 2005/0282939 A1 | 12/2005 | Weber et al. |
| 2011/0113989 A1 | 5/2011 | Brackhagen et al. |

FOREIGN PATENT DOCUMENTS

| | | |
|---|---|---|
| EP | 0954536 B1 | 11/1999 |
| EP | 1127910 A1 | 8/2001 |
| GB | 2262527 A | 6/1993 |
| WO | 9964368 A1 | 12/1999 |
| WO | 2008122345 A1 | 10/2008 |
| WO | 2009018876 A1 | 2/2009 |

*Primary Examiner* — Paul Marcantoni
(74) *Attorney, Agent, or Firm* — Steven W. Mork

(57) ABSTRACT

The present invention relates to polysaccharide derivatives having an adjusted particle morphology for use in the preparation of a hydraulic setting composition having an adjusted lump rating. The invention further relates to a method of adjusting the lump rating of a hydraulic setting composition comprising adjusting the particle morphology of a particulate polysaccharide derivative. Furthermore, the invention is directed to a hydraulic setting composition comprising a particulate polysaccharide derivative having an adjusted particle morphology. The invention is also directed to various uses of the particulate polysaccharide derivative having an adjusted particle morphology.

12 Claims, No Drawings

POLYSACCHARIDE DERIVATIVES HAVING AN ADJUSTED PARTICLE MORPHOLOGY FOR HYDROLYTICALLY SETTING COMPOSITIONS

The present invention relates to polysaccharide derivatives having an adjusted particle morphology for use in the preparation of a hydraulic setting composition having an adjusted lump rating. The invention further relates to a method of adjusting the lump rating of a hydraulic setting composition comprising adjusting the particle morphology of a particulate polysaccharide derivative and including the particulate polysaccharide in the hydraulic setting composition. Furthermore, the invention is directed to a hydraulic setting composition comprising a particulate polysaccharide derivative having an adjusted particle morphology. The invention is also directed to various uses and methods of use of the particulate polysaccharide derivative having an adjusted particle morphology.

BACKGROUND OF THE INVENTION

Polysaccharide derivatives, e.g. cellulose ethers, can be successfully used as thickeners and water retention additives in hydraulic setting compositions, e.g. gypsum spray plaster compositions. The complete wetting of e.g. gypsum after the addition of water is delayed to some extent due to the high surface energy of the gypsum particles even if no polysaccharide derivatives are present. In the presence of polysaccharide derivatives, however, the water which wets all gypsum particles is thickened as the polysaccharide particles are solubilized. As a consequence, the mobile aqueous phase is less effective in wetting the gypsum. During the application unwetted gypsum lumps become visible in the plaster as it gets spread evenly on a wall after spraying. These lumps are optical defects and additional work and force is required during the subsequent working steps of plaster application to remove them completely, if ever possible. A hydraulic setting composition, especially a gypsum spray plaster, with no or minimal lumps would be desirable as it allows easier and faster application. The workers can apply more area per day of defect free hydraulic setting composition.

One way of effective lump reduction in gypsum plaster would be the use of granular cellulose ethers (<50 wt. % having a particle size of up to 200 microns). However, the high content of large cellulose ether particles would result in poor water retention of the sprayed plaster on the wall. During the short time span between mixing and spraying (about 10 sec) the coarse particles will not completely dissolve and the plaster will have insufficient water retention and post-thickening will be observed.

Another way of reducing lumps in hydraulic setting compositions, e.g. gypsum plaster, would be the use of Methocel™ J-grades of cellulose ethers (Dow Chemical, Midland, Mich.). The high amount of substituents give the cellulose ether some thermoplastic properties so that it almost completely loses its fibrous structure and shows similar fibre thickness and diameter of the equivalent particle circle as the polysaccharide derivatives of the present invention. Unfortunately, the production costs of such cellulose ethers are very high and the process yields a waste water stream that is both undesirable and costly to handle and/or dispose.

GB 2262527A describes the pre-treatment of a wet cellulose ether filter cake prior to milling in order to obtain a cellulose ether with reduced lump formation. The wet filter cake has a water content of 30-80 wt. % and is cooled down to a temperature of 40-120° C. The examples show that the process can increase the bulk density of the cellulose ethers. No reference is given to the grinding technology used in the process. And apart from a mean particle size no information is given on the particle size distribution and on the morphology of the cellulose ether powder.

The problem addressed by the invention is to provide a hydraulic setting composition, e.g. a mortar or plaster composition, having an improved lump rating or an improved water retention behaviour, or both. A further problem addressed by the invention is to provide a method of making a hydraulic setting composition, wherein one or more of its properties selected from lump rating and water retention can be adjusted by simply including a tailored particulate polysaccharide compound to the hydraulic setting composition, which imparts the desired properties to the hydraulic setting composition.

STATEMENT OF THE INVENTION

The inventors have now found that if a particulate polysaccharide derivative having an adjusted or desired particle morphology represented by the median particle diameter DOP (50,3) and the median particle diameter of the equivalent particle circle EQPC (50,3) is added to a hydraulic setting composition the lump rating of the hydraulic setting composition can be adjusted or improved.

In a first aspect of the invention, there is provided a method of making a hydraulic setting composition comprising adding a particulate polysaccharide derivative having a median particle diameter DOP (50,3) of at least 38 micrometers and a median particle diameter of the equivalent particle circle EQPC (50,3) of at least 80 micrometers to the hydraulic setting composition. Preferably, the polysaccharide derivative has a median particle length of at least 50 micrometers, and up to 2000 micrometers, more preferably up to 600 micrometers, and most preferably up to 350 micrometers.

In a second aspect of the invention, there is provided the a method of making a hydraulic setting composition, comprising adding a particulate polysaccharide derivative to the hydraulic setting composition, wherein the method further comprises ensuring that the particulate polysaccharide derivative has a median particle diameter DOP (50,3) of at least 38 micrometers and a median particle diameter of the equivalent particle circle EQPC (50,3) of at least 80 micrometers.

In a third aspect of the invention, there is provided the a method of adjusting the lump rating of a hydraulic setting composition, the method comprising: a) providing a hydraulic setting composition which is free of any particulate polysaccharide derivative, and b) adding a particulate polysaccharide derivative having an adjusted median particle diameter DOP (50,3) of at least 38 micrometers and an adjusted median particle diameter of the equivalent particle circle EQPC (50,3) of at least 80 micrometers to the hydraulic setting composition.

In a fourth aspect of the invention, there is provided a hydraulic setting composition comprising a particulate polysaccharide derivative, wherein the particulate polysaccharide derivative has a median particle diameter DOP (50,3) of at least 38 micrometers and a median particle diameter of the equivalent particle circle EQPC (50,3) of at least 80 micrometers.

In a fifth aspect of the invention, there is provided the use of a particulate polysaccharide derivative having a median particle diameter DOP (50,3) of at least 38 micrometers and a median particle diameter of the equivalent particle circle EQPC (50,3) of at least 80 micrometers in a method of making a hydraulic setting composition or in a method of adjusting the lump rating of a hydraulic setting composition.

In a sixth aspect of the invention, there is provided the use of a particulate polysaccharide derivative having a median particle diameter DOP (50,3) of at least 38 micrometers and a median particle diameter of the equivalent particle circle EQPC (50,3) of at least 80 micrometers as a compound in a hydraulic setting composition.

It is surprising that by adjusting the particle morphology represented by the median particle diameter DOP (50,3) and the median particle diameter of the equivalent particle circle EQPC (50,3) of a polysaccharide derivative the lump rating of a hydraulic setting composition can be adjusted if the polysaccharide derivative is added to the hydraulic setting composition.

DETAILED DESCRIPTION OF THE INVENTION

The present invention relates on the one hand to a method of making a hydraulic setting composition and on the other hand to a method of adjusting the lump rating of a hydraulic setting composition. Both methods comprises the step of adding a particulate polysaccharide derivative having a median particle diameter DOP (50,3) of at least 38 micrometers and a median particle diameter of the equivalent particle circle EQPC (50,3) of at least 80 micrometers to the hydraulic setting composition. According to an alternative method of making a hydraulic setting composition, the method comprises ensuring that the particulate polysaccharide derivative comprised in the hydraulic setting composition has a DOP (50,3) of at least 38 micrometers and an EQPC (50,3) of at least 80 micrometers.

The polysaccharide derivatives used in this invention have an adjusted particle morphology, represented by the DOP (50,3) and the EQPC (50,3), which helps to control the solubilization kinetics during the first few seconds when the formulated hydraulic setting composition gets in contact with water e.g. in a spray plaster machine. The polysaccharide derivative particles have less fine content, a higher fibre thickness and a defined diameter of the equivalent particle circle. The polysaccharide does not go into solution that quickly, allowing the water to completely wet the hydraulic setting composition powder. And the polysaccharide derivative goes into solution as complete as possible during the time span from mixing until spraying onto the wall so that it provides its full water retention capability.

Surprisingly, it has been found that there is a correlation between the particle morphology, represented by the DOP (50,3) and the EQPC (50,3), of the polysaccharide derivative and the lump rating of the hydraulic setting composition to which the polysaccharide derivative having the adjusted particle morphology is added.

It is therefore preferred that the method of making a hydraulic setting composition comprises adjusting the lump rating of the hydraulic setting composition by adjusting the DOP (50,3) to a value of at least 38 micrometers and by adjusting the EQPC (50,3) to a value of at least 80 micrometers of the particulate polysaccharide derivative added to the hydraulic setting composition.

"Adjusting", as used herein, means in this context that the particle morphology of the polysaccharide derivative added to the composition is controlled and, if necessary, adjusted in a way to have a DOP (50,3) and an EQPC (50,3) such that a desired lump rating is imparted to the hydraulic setting composition.

For example, in the method of "adjusting" the lump rating of a hydraulic setting composition, the method comprising the steps of: a) providing a hydraulic setting composition which is free of any particulate polysaccharide derivative, and b) adding a particulate polysaccharide derivative having an "adjusted" median particle diameter DOP (50,3) of at least 38 micrometers and an "adjusted" median particle diameter of the equivalent particle circle EQPC (50,3) of at least 80 micrometers to the hydraulic setting composition, "adjusting" can be done by the following steps:

a) providing a first hydraulic setting composition free of any particulate polysaccharide derivative and a second hydraulic setting composition free of any particulate polysaccharide derivative,
b) adding a first particulate polysaccharide derivative to the first hydraulic setting composition and adding a second particulate polysaccharide derivative to the second hydraulic setting composition, wherein each DOP (50,3) of the first and second particulate polysaccharide derivative is at least 38 micrometers and each EQPC (50,3) of the first and second particulate polysaccharide derivative is at least 80 micrometers, and further wherein the DOP (50,3) and the EQPC (50,3) of the first and the second particulate polysaccharide derivative are different from one another,
c) determining the lump rating of the first and the second hydraulic setting composition,
d) establishing the correlation between i) the DOP (50,3) and the EQPC (50,3) of each first and second particulate polysaccharide derivative, and ii) the lump rating of each first and second hydraulic setting composition,
e) utilizing the established correlation to adapt the DOP (50,3) and the EQPC (50,3) of the particulate polysaccharide derivative added to the hydraulic setting composition to the desired lump rating of the hydraulic setting composition.

As used herein, the term "ensuring" a specified DOP and/or EQPC means measuring for DOP and/or EQPC and, if necessary, i.e. any of the DOP and/or EQPC is not at a desired value, adjusting the DOP and/or EQPC by dry grinding, if need be, further with adjustment of the moisture content and/or temperature of the particulate polysaccharide prior to dry grinding.

"Adding" as used in the present invention means that the polysaccharide derivative having the adjusted particle morphology is included or comprised in the final hydraulic setting composition. The polysaccharide derivative can be added during or after the preparation of the base hydraulic setting composition. It can be added either alone or in combination with other ingredients of the hydraulic setting composition. So, it has to be ensured that the particulate polysaccharide derivative having the DOP (50,3) of at least 38 micrometers and the EQPC (50,3) of at least 80 micrometers is included or comprised in the final hydraulic setting composition.

In the methods of making a hydraulic setting composition comprising adding a particulate polysaccharide derivative having a DOP (50,3) of at least 38 micrometers and an EQPC (50,3) of at least 80 micrometers to the hydraulic setting composition, the hydraulic setting composition is free of any particulate polysaccharide derivative prior to adding the particulate polysaccharide derivative having a DOP (50,3) of at least 38 micrometers and an EQPC (50,3) of at least 80 micrometers to the hydraulic setting composition.

Further with respect to the definition of "adding", the above described method of making a hydraulic setting composition can alternatively further comprise ensuring that the particulate polysaccharide derivative has a DOP (50,3) of at least 38 micrometers and an EQPC (50,3) of at least 80 micrometers.

It has surprisingly been found that a higher median particle diameter DOP (50,3) and a higher median particle diameter of the equivalent particle circle EQPC (50,3) of the particulate polysaccharide derivative added to the hydraulic setting composition leads to an improved lump rating of the hydraulic setting composition and vice versa. This finding does not only allow tailoring an important property of hydraulic setting compositions but also the production of improved hydraulic setting composition with respect to lump rating.

The diameter of the particles is called DOP. The DOP is preferably measured by a high speed image analysis system which combines particle size and shape analysis. This specific image analysis method is described in: W. Witt, U. Kohler, J. List, Current Limits of Particle Size and Shape Analysis with High Speed Image Analysis, PARTEC 2007.

The median particle diameter DOP (50,3) is defined as follows: All particle size distributions, e.g. the DOP can be displayed and applied as number (O), length (1), area (2) or volume (3) distribution. The volume distribution of the DOP is calculated as cumulative distribution $Q_3$. The volume distribution within the particle diameter value DOP (50,3) is designated by the number 3 after the comma. The designation 50, reflecting the median value, stands for 50% of the diameter of particle distribution being smaller than the given value in μm and 50% being larger. The 50% DOP value is calculated by the image analyzer software. A high speed image analysis system is commercially available from Sympatec GmbH, Clausthal Zellerfeld, Germany as dynamic image analysis (DIA) system QICPIC™. The system analyses the shape of the particles and takes potential curliness of the particles into account. It provides a more accurate measurement of true particle sizes than other methods. The dynamic image analysis (DIA) system QICPIC™ is described in more detail by Witt, W., Köhler, U., List, J.: Direct Imaging of very fast Particles Opens the Application of Powerful (dry) Dispersion for Size and Shape Characterization, PARTEC 2004, Nuremberg, Germany.

The EQPC of the particle is defined as the diameter of a circle that has the same area as the projection area of the particle. The EQPC is preferably measured by a high speed image analysis system which combines particle size and shape analysis. This specific image analysis method is described in more detail by Witt, W., Köhler, U., List, J.: Direct Imaging of very fast Particles Opens the Application of Powerful (dry) Dispersion for Size and Shape Characterization, PARTEC 2004, Nuremberg, Germany.

The EQPC (50,3) is the median diameter of a Circle of Equal Projection Area and is defined as follows: All particle size distributions, e.g. the EQPC can be displayed and applied as number (O), length (1), area (2) or volume (3) distribution. The volume distribution of the EQPC is calculated as cumulative distribution $Q_3$. The volume distribution within the diameter of a Circle of Equal Projection Area value EQPC 50,3 is designated by the number 3 after the comma. The designation 50, reflecting the median value, stands for 50% of the EQPC of particle distribution being smaller than the given value in μm and 50% being larger. The 50% EQPC value is calculated by the image analyzer software.

The polysaccharide derivative used in the methods of the invention preferably has a median particle diameter DOP (50,3) of at least 35 micrometers, more preferably at least 38 micrometers, even more preferably at least 42 micrometers and most preferably at least 45 micrometers. The polysaccharide derivative preferably has a median particle diameter DOP (50,3) of up to 150 micrometers, more preferably up to 100 micrometers, and most preferably up to 80 micrometers.

The polysaccharide derivative used in the methods of the invention preferably has a median particle diameter of the equivalent particle circle EQPC (50,3) of at least 75 micrometers, more preferably at least 80 micrometers, even more preferably at least 85 micrometers and most preferably at least 90 micrometers. The polysaccharide derivative preferably has a EQPC (50,3) of up to 250 micrometers, more preferably up to 200 micrometers, and most preferably up to 150 micrometers.

It is particularly preferred that the polysaccharide derivative used in the methods of the invention has a median particle diameter DOP (50,3) of at least 35 micrometers and a median particle diameter of the equivalent particle circle EQPC (50, 3) of at least 75 micrometers, more preferably a DOP (50,3) of at least 38 micrometers and a EQPC (50,3) of at least 80 micrometers, and most preferably a DOP (50,3) of at least 42 micrometers and a EQPC (50,3) of at least 85 micrometers.

The methods of the present invention relates in general to hydraulic setting compositions. In preferred aspects of the invention the methods of making and improving such compositions relates to gypsum plaster, lime plaster, cement plaster, or mixtures of one or more of these plasters. In a particularly preferred aspect the compositions are gypsum spray plasters, lime spray plasters, cement spray plasters, or mixtures of one or more of these spray plasters.

The polysaccharide derivatives, preferably the cellulose derivatives, used in this process are generally soluble or at least soakable in solvents, preferably water. Preferred polysaccharide derivatives are polysaccharide ethers and polysaccharide esters, more preferably cellulose ethers and esters, most preferably water-soluble cellulose ethers. They can have one or more substituents, preferably of the types: hydroxyethyl, hydroxypropyl, hydroxybutyl, methyl, ethyl, propyl, dihydroxypropyl, carboxymethyl, sulfoethyl, hydrophobic long-chain branched and unbranched alkyl groups, hydrophobic long-chain branched and unbranched alkyl aryl groups or aryl alkyl groups, cationic groups, acetate, propionate, butyrate, lactate, nitrate or sulfate, of which some groups, such as, for example, hydroxyethyl, hydroxypropyl, hydroxybutyl, dihydroxypropyl and lactate, are capable of forming grafts. The substituents of the polysaccharides according to the invention are not limited to these groups. Typical polysaccharide derivatives are guar derivatives, starch derivatives, chitin or chitosan derivatives, and preferably cellulose derivatives, but the polysaccharide derivatives according to the invention are not limited to these.

Examples of cellulose derivatives are hydroxyethyl cellulose (HEC), hydroxypropyl cellulose (HPC), ethyl hydroxyethyl cellulose (EHEC), carboxymethyl cellulose, carboxymethyl hydroxyethyl cellulose (CMHEC), hydroxypropyl hydroxyethyl cellulose (HPHEC), methyl cellulose (MC), methyl hydroxypropyl cellulose (MHPC), methyl hydroxyethyl cellulose (MHEC), carboxymethyl cellulose (CMC), hydroxypropyl methylcellulose acetate succinate (HPMC-AS), hydrophobically modified hydroxyethyl cellulose (hmHEC), hydrophobically modified hydroxypropyl cellulose (hmHPC), hydrophobically modified ethyl hydroxyethyl cellulose (hmEHEC), hydrophobically modified carboxymethyl hydroxyethyl cellulose (hmCMHEC), hydrophobically modified hydroxypropyl hydroxyethyl cellulose (hmHPHEC), hydrophobically modified methyl cellulose (hmMC), hydrophobically modified methyl hydroxypropyl cellulose (hmMHPC), hydrophobically modified methyl hydroxyethyl cellulose (hmMHEC), hydrophobically modified carboxymethyl methyl cellulose (hmCMMC), sulfoethyl cellulose (SEC), hydroxyethyl sulfoethyl cellulose (HESEC), hydroxypropyl sulfoethyl cellulose (HPSEC), methyl hydroxyethyl sulfoethylcellulose (MHESEC), methyl hydroxypropyl sulfoethyl cellulose (MHPSEC), hydroxyethyl hydroxypropyl sulfoethyl cellulose (HEHPSEC), carboxymethyl sulfoethyl cellulose (CMSEC), hydrophobically modified sulfoethyl cellulose (hmSEC), hydrophobically modified hydroxyethyl sulfoethyl cellulose (hmHESEC), hydrophobically modified hydroxypropyl sulfoethyl cellulose (hmHPSEC) or hydrophobically modified hydroxyethyl hydroxypropyl sulfoethyl cellulose (hmHEHPSEC). Particularly preferred cellulose derivatives are cellulose ethers having a thermal flocculation point in water, such as, for example, methyl cellulose, methyl hydroxyethyl cellulose, methyl hydroxypropyl cellulose and hydroxypropyl cellulose.

The particulate polysaccharide derivative added to the hydraulic setting composition and having the adjusted particle morphology, represented by the DOP (50,3) and the EQPC (50,3), is preferably produced by adjusting the moisture content and the temperature of the polysaccharide derivative prior to dry-grinding and dry-grinding a moist polysaccharide derivative.

The production of polysaccharide derivatives, preferably polysaccharide ethers and polysaccharide esters is known in the art. Typically the production process involves activating the polysaccharide, such as cellulose, for example by treatment with an alkali metal hydroxide, reacting the thus treated polysaccharide with a derivatizing agent, such as an etherifying or esterifying agent, and washing the polysaccharide derivative to remove by-products. After the washing step the polysaccharide derivative generally has a moisture content of from 30 to 60 percent, typically from 45 to 55 percent, based on the total weight of the moist polysaccharide derivative. While the preferred washing liquor may depend on the specific type of polysaccharide derivative, preferred washing liquors generally are water, isopropanol, acetone, methylethylketone or brine. More preferred washing liquors generally are water or brine. Optionally the polysaccharide derivative is dried before adding a solvent to the polysaccharide derivative for moisture control, but this procedure is less preferred. Preferably a polysaccharide derivative obtained directly after production, washing and optionally cooling is used as a starting material for the present invention. Cellulose derivatives are generally washed at a temperature of from 20 to 120° C., preferably from 65 to 95° C. A solvent-moist, preferably a water-moist filter cake is obtained after washing and separating the polysaccharide derivative from the washing liquor. The moist polysaccharide derivative is usually obtained in the shape of moist granules, moist lumps and/or a moist paste.

According to a preferred method the polysaccharide derivative used for the hydraulic setting composition of the present invention has been obtained by separating a polysaccharide derivative from a suspension thereof in a liquid, such as water, and is subsequently subjected to dry-grinding in a dry-grinding device. The suspension of particles in a liquid can originate from the production and washing the polysaccharide derivative, as described above. Separating a polysaccharide derivative from a suspension can be carried out in a known way, such as centrifugation.

According to an alternative method, a dry polysaccharide derivative and a liquid, such as water, can be mixed in a compounder and the thus obtained moist polysaccharide derivative is subsequently subjected to dry-grinding in a dry-grinding device according to the process of the present invention. The compounder preferably allows thorough and intense mixing. Useful compounders are, for example, granulators, kneaders, extruders, presses, or roller mills, wherein the mixture of the polysaccharide derivative and liquid is homogenised by applying shear forces and compounding, such as a twin-screw compounder. Co-rotating as well as counter-rotating machines are suitable. So-called divided trough kneaders with two horizontally arranged agitator blades that engage deeply with one another and that perform a mutual stripping action, as in the case of twin-screw compounders are particularly suitable. Suitable single-shaft, continuous kneaders include the so-called Reflector® compounders, which are high performance mixers of modular construction, consisting of a multi-part, heatable and coolable mixing cylinder and a unilaterally mounted blade mixer (manufacturer: Lipp, Germany). Also suitable are so-called pinned cylinder extruders or Stiftconvert® extruders (manufacturer: Berstorff, Germany). The pins incorporated in the housing serve as abutments in order to prevent the kneaded material rotating together with the shaft. Kneader mixers with so-called double-blade sigma stirrers (manufacturer: Fima, Germany) in a horizontal assembly are particularly suitable. The blades operate at different speeds and their direction of rotation can be reversed. A stirred vessel with a vertically arranged mixer shaft is also suitable if suitable flow baffles are mounted on the vessel wall in order to prevent the kneaded mass rotating together with the stirrer shaft, and in this way an intensive mixing action is imparted to the kneaded material (manufacturer: Bayer AG). Also suitable are double-walled mixing vessels with a planetary stirrer and inline homogeniser.

Dry-grinding is generally described in the art as drying and grinding simultaneously in one process step with one unit operation, typically an impact mill or an air swept impact mill. Drying is typically accomplished with a combination of hot gas and mechanical energy. Hot air is most commonly used but also hot nitrogen gas can be used. The hot gas and the wet product stream are generally fed via separate inlets into the mill, typically hot gas from the bottom and wet product at a side entrance via a feed screw system connected to the mill. The circumferential speed of the dry-grinding device is preferably controlled and optionally varied or adjusted in a range from 35 to 140 m/s, more preferably from 45 to 120 m/s, most preferably from 55 to 115 m/s. Dry-grinding is generally described in the art as drying and grinding simultaneously in one process step with one unit operation.

Within the present invention, the DOP (50,3) of at least 38 micrometers and the EQPC (50,3) of at least 80 micrometers of the particulate polysaccharide derivative used in the hydraulic setting composition and obtainable after dry-grinding as mentioned above can be adjusted by adjusting the temperature of the polysaccharide derivative prior to dry-grinding and the moisture content of the polysaccharide derivative prior to dry-grinding.

"Adjusting" means in this context that the temperature of the polysaccharide derivative prior to dry-grinding and the moisture content of the polysaccharide derivative prior to dry-grinding is controlled and, if necessary, adjusted in a way to find a temperature and a moisture content such that a desired DOP (50,3) of at least 38 micrometers and a desired EQPC (50,3) of at least 80 micrometers is imparted to the particulate polysaccharide derivative.

For example, "adjusting" the temperature and the moisture content of the polysaccharide derivative prior to dry-grinding can be done by the following steps:

a) dry-grinding at least three samples, preferably at least 4 samples, more preferably at least 8 samples of a moist polysaccharide derivative, each sample having a different temperature and/or a different moisture content prior to dry-grinding, particularly preferred dry-grinding at least 8 samples of a moist polysaccharide derivative, at least four samples having a different temperature at a given moisture content and at least four samples having a different moisture content at a given temperature prior to dry-grinding, b) determining the DOP (50,3) and the EQPC (50,3) of the polysaccharide derivative particles after dry-grinding of each of the samples, c) establishing the correlation between i) the DOP (50,3) and the EQPC (50,3) of the polysaccharide derivative particles after dry-grinding, and ii) the temperature and the moisture content of the polysaccharide derivative prior to dry-grinding, and d) utilizing the established correlation to adapt the temperature and the moisture content of the polysaccharide derivative prior to dry-grinding to the desired DOP (50,3) of at least 38 micrometers and the desired EQPC (50,3) of at least 80 micrometers of the particulate polysaccharide derivative after dry-grinding.

In the context of the present invention the temperature of the polysaccharide derivative prior to dry-grinding is preferably adjusted in a range from 5 to 60° C., more preferably from 10 to 55° C., even more preferably from 15 to 50° C., and most preferably from 20 to 45° C. If the wet filter cake is maintained at a temperature of above 60° C., the cellulose ether may not gel and/or may not remain the initial cellulose fiber morphology. If a liquid such as water is added to the polysaccharide derivative prior to dry-grinding, the temperature of the polysaccharide derivative prior to dry-grinding is preferably controlled and optionally varied or adjusted by controlling and optionally varying or adjusting the temperature of the added liquid and/or the jacket temperature of the compounder.

This can be achieved continuously, without interrupting the dry-grinding process, or not.

In the context of the present invention the desired moisture content is preferably 40 percent or more, more preferably 50 percent or more, even more preferably 60 percent or more, and most preferably 70 percent or more prior to dry-grinding, based on the total weight of the moist polysaccharide derivative. If the moisture level is lower than 40 percent the cellulose ether fibres may remain too fibrous. The moisture content is preferably 98 percent or less, more preferably 90 percent or less, even more preferably 85 percent or less, and most preferably 80 percent or less prior to dry-grinding, based on the total weight of the moist polysaccharide derivative. The moisture content can be determined by ASTM method D-2363-79 (reapproved 1989), but preferably it is indirectly determined by measuring the DOP (50,3) and the EQPC (50,3) of the polysaccharide derivative particles after dry-grinding and determining the correlation between the DOP (50,3) and the EQPC (50,3) of the polysaccharide derivative particles after dry-grinding and the moisture content of the polysaccharide derivative prior to dry-grinding, as described above.

Preferably the determined correlation between the DOP (50,3) and the EQPC (50,3) of the polysaccharide derivative particles after dry-grinding and the moisture content prior to dry-grinding and/or the temperature of the particulate polysaccharide prior to dry-grinding is used as in-process control in a continuous dry-grinding process wherein the DOP (50,3) and the EQPC (50,3) of dry-ground particles is determined and used for setting and optionally adapting the moisture content and/or temperature of the polysaccharide derivative prior to dry-grinding. Most preferably, the in-process control is carried out on-line.

Adapting the optimum moisture content for the polysaccharide derivative prior to dry-grinding to the desired DOP (50,3) and the EQPC (50,3) of the polysaccharide derivative particles after dry-grinding not only improves the control of the particle sizes after dry-grinding but also optimizes the energy required in the dry-grinding step. Uneconomical over-dosage of water which would need to be evaporated in the subsequent dry-grinding process or under-dosage of water which would result in products of undesirably performance can be avoided by the process of the present invention. Moreover, the DOP (50,3) and the EQPC (50,3) of the polysaccharide derivative particles can be adjusted without varying the parameters of the dry-grinding device or process, such as circumferential speed, air or gas flow through the mill (m3/h). When a change in DOP (50,3) and the EQPC (50,3) of the polysaccharide derivative particles is desired or when the DOP (50,3) and the EQPC (50,3) of the polysaccharide derivative particles does not meet the desired product specification and has to be adjusted, such change can be achieved without interrupting the dry-grinding process by adjusting the moisture content of the polysaccharide derivative prior to dry-grinding. This makes the process of the present invention very efficient.

Suitable solvents for the soaking or dissolving are solvents whose molecules have polar groups which preferably contain the hetero atoms nitrogen, sulfur or oxygen. However, hydrocarbons and halogenated hydrocarbons may also be used. Preferred solvents are water, alcohols such as methanol, ethanol or isopropanol or esters such as ethyl acetate and butyl acetate. The particularly preferred solvent is water. The term "solvent" as used herein also includes mixtures of solvents.

The moist polysaccharide derivative which is prior to dry-grinding usually in the shape of moist granules, moist lumps and/or a moist paste can be conducted in a known dry-grinding device, for example in a gas-swept impact mill, preferably an air-swept impact mill, wherein the polysaccharide derivative is subjected to an impacting and/or shearing stress. Suitable mills are, for example, hammer mills, screen-type mills, pin mills, disk mills, jet mills, or preferably classifier mills. Superheated vapour of a solvent, such as superheated steam, or a steam/inert gas mixture or a steam/air mixture can be used as heat-transfer gas and transport gas, as described in more detail in European Patent Applications EP 0 954 536 A1 and EP 1 127 910 A1. In the dry-grinding process of the present invention the moisture content of the polysaccharide derivative after dry-grinding is typically reduced to 1 to 20 percent, preferably 1 to 10 percent, more preferably 1 to 5 percent, based on the total weight of the moist polysaccharide derivative.

In the preferred case that the dry-grinding is conducted in a rotational dry-grinding device the DOP (50,3) and the EQPC (50,3) of the polysaccharide derivative particles after dry-grinding can be adjusted by adjusting the circumferential speed of the dry-grinding device in a similar manner as described above for the temperature and the moisture content, in addition to adjusting the temperature and the moisture content of the polysaccharide derivative prior to dry-grinding. "Adjusting" when dry-grinding is conducted in a rotational dry-grinding device means that the circumferential speed of the dry-grinding device is controlled and, if necessary, adjusted in a way to find a circumferential speed of the dry-grinding device such that a desired DOP (50,3) of at least 38 micrometers and a desired EQPC (50,3) of at least 80 micrometers is imparted to the particulate polysaccharide derivative.

In the context of the present invention the circumferential speed of the dry-grinding device, i.e. the tip speed of the rotating milling knife, is preferably adjusted to 70 m/s or greater, preferably 80 m/s or greater, and more preferably 90 m/s or greater. If the tip speed is lower than 60 m/s the cellulose ether may become too coarse. If the tip speed is higher than 130 m/s the cellulose ether may become too fine.

In a particularly preferred aspect of the invention the dry-grinding is conducted in a rotational dry-grinding device, and the morphology represented by the DOP (50,3) and the EQPC (50,3) of the particles after dry-grinding is adjusted by the circumferential speed of the dry-grinding device in addition to adjusting the moisture content and the temperature of the polysaccharide derivative prior to dry-grinding.

The present invention is further illustrated by the following Examples which are not to be construed to limit the scope of the invention. Unless otherwise indicated, all parts and percentages are by weight.

Examples

Description of the Cellulose Ether Grinding and Morphology Control Process

A commercially available continuous compounder was used to add water to dry WALOCEL™ MKX 60000 PF01 cellulose ether, commercially available from The Dow Chemical Company. The compounder jacket was supplied with a fluid of −1° C.

The cellulose ethers shown in Table 1 were fed continuously at a feed rate of 10 kg/h into the compounder. Water of a temperature of about 7-8° C. was continuously added at rates between 20.8 and 30.0 kg/h to the compounder resulting in moisture levels between 68 and 76% by weight, the temperatures were adjusted to between 20 and 40° C., as shown in Table 2.

TABLE 1

| Product name | Process information |
| --- | --- |
| Methocel K 250M | Regular HPMC, produced in Stade, ball mill finished |
| MKX 60000 PF01 | Pilot plant HEMC, Pfleiderer trial 65 wt.-% water |
| MKX 60000 PF01 | Pilot plant HEMC, Pfleiderer trial 75 wt.-% water |
| MKX 60000 PF01 | commercial HEMC, existing HDMT trains |
| MKX 60000 PF01 | commercial HEMC, existing HDMT trains |

TABLE 2

| Product name | Lot number | Moisture cont. [wt.-%] | Dough Temp. [° C.] | Milling Techn. | Tip Speed [m/s] |
| --- | --- | --- | --- | --- | --- |
| Methocel K 250M | WE031907A3 | 45 | Not cooled | Ball mill | Not applic. |
| MKX 60000 PF01 | WP73 | 68 | 20 | Impact mill | 91 |
| MKX 60000 PF01 | WP74 | 76 | 25 | Impact mill | 104 |
| MKX 60000 PF01 | WK1550NAPA | 75 | 40 | Impact mill | 115 |
| MKX 60000 PF01 | WH2450NAPV | 75 | 40 | Impact mill | 115 |

The wet products were transported continuously via a transport belt into a mill feed unit (Altenburger Maschinen Jaeckering GmbH, Hamm, Germany). The bottom blades of the vessel agitator pressed the paste into a single augur screw mounted at the bottom of the vessel. The wet product was forced through a perforated plate directly into the side of an Ultrarotor II "S" impact mill (Altenburger Maschinen Jaeckering GmbH, Hamm, Germany) between the first and second grinding stage. The mill was equipped with 7 grinding stages. The bottom 3 grinding stages were equipped with standard grinding bars. Turbo-bars were installed in the top 4 grinding stages. A co-rotating finger sifter wheel with 12 blades was installed on the top of the 7th grinding stage. The interior of mill jacket had the standard Altenburger corrugated stationary grinding plates.

The rotor of the impact mill was operated at a circumferential speed as shown in Table 2. A hot gas stream, i.e. nitrogen was fed with 1020 m³/h into the bottom gas inlet of the mill. A cyclone was used to separate the dried product from the nitrogen. The final product moisture was 2.2-3.6% by weight.

Description of the Gypsum Plaster Spraying Process

A gypsum spray plaster formulation contains 0.250 weight-parts of cellulose ether per 100 weight-parts of gypsum spray plaster base. The spray plaster "Knauf MP 75" used is obtained from Knauf, Westdeutsche Gipswerke, Germany (Rottleberode plant). The base material is used as received and mixed with the cellulose ether with a Loedige plough-share blender.

The plaster is applied on a brick wall with a spray machine ("PFT G4" spray machine, produced by PFT GmbH & Co, Germany) using a water feed rate of 320-330 liters per hour and hose pressure of 8-10 bar.

Evaluation of lumping is carried out by taking into account the number of lumps and their size giving the top mark to the cellulose ether having the lowest number of lumps upon spray application and initial levelling of the gypsum plaster (done 5 min after spray application). This sample is serving as a reference and all other cellulose ethers are ranked according to their lump formation with a low number of lumps marked better.

Results are shown in Table 3:

TABLE 3

| Product | lump rating | EQPC(50.3) [micrometer] | DOP(50.3) [micrometer] | Water Retention [%] |
| --- | --- | --- | --- | --- |
| Methocel K 250M | 5 | 90.3 | 35.6 | 97.3 |
| MKX 60000 PF01 | 2 | 99.2 | 47.7 | 96.5 |
| MKX 60000 PF01 | 6 | 78.3 | 43.6 | 95.8 |
| MKX 60000 PF01 | 3 | 93.92 | 45.69 | 96.8 |
| MKX 60000 PF01 | 4 | 90.2 | 43.3 | 97.1 |

What is claimed is:

1. A method of making a hydraulic setting composition comprising adding a particulate polysaccharide derivative selected from a group consisting of polysaccharide ethers and esters having a median particle diameter DOP (50,3) of at least 38 micrometers and a median particle diameter of the equivalent particle circle EQPC (50,3) of at least 80 micrometers to the hydraulic setting composition.

2. The method of claim 1, wherein the hydraulic setting composition is free of any particulate polysaccharide derivative selected from a group consisting of polysaccharide ethers and esters prior to adding the particulate polysaccharide derivative selected from a group consisting of polysaccharide ethers and esters having a DOP (50,3) of at least 38 micrometers and an EQPC (50,3) of at least 80 micrometers.

3. The method of claim 1 or 2, further comprising adjusting the lump rating of the hydraulic setting composition by adjusting the DOP (50,3) and the EQPC (50,3) of the particulate polysaccharide derivative selected from a group consisting of polysaccharide ethers and esters added to the hydraulic setting composition.

4. A method of making a hydraulic setting composition, wherein the composition comprises a particulate polysaccharide derivative selected from a group consisting of polysaccharide ethers and esters, and, further wherein the method comprises ensuring that the particulate polysaccharide derivative has a median particle diameter DOP (50,3) of at least 38 micrometers and a median particle diameter of the equivalent particle circle EQPC (50,3) of at least 80 micrometers.

5. A method of adjusting the lump rating of a hydraulic setting composition, the method comprising the steps of:
   a) providing a hydraulic setting composition which is free of any particulate polysaccharide derivative selected from a group consisting of polysaccharide ethers and esters, and
   b) adding a particulate polysaccharide derivative selected from a group consisting of polysaccharide ethers and esters having an adjusted median particle diameter DOP (50,3) of at least 38 micrometers and an adjusted median particle diameter of the equivalent particle circle EQPC (50,3) of at least 80 micrometers to the hydraulic setting composition.

6. The method according to claim 1, 2, 4 or 5, wherein the composition is a gypsum plaster, a lime plaster, a cement plaster, or a mixture of one or more of these plasters or is a gypsum spray plaster, a lime spray plaster, a cement spray plaster, or a mixture of one or more of these spray plasters.

7. The method according to claim 1, 2, 4 or 5, wherein the polysaccharide derivative selected from a group consisting of polysaccharide ethers and esters is a cellulose derivative.

8. The method according to claim 1, 2, 4 or 5, wherein the particulate polysaccharide derivative selected from a group consisting of polysaccharide ethers and esters having the DOP (50,3) of at least 38 micrometers and the EQPC (50,3) of at least 80 micrometers is produced by dry-grinding a moist polysaccharide derivative selected from a group consisting of polysaccharide ethers and esters, and, further wherein, the DOP (50,3) of at least 38 micrometers and the EQPC (50,3) of at least 80 micrometers of the particles after dry-grinding is adjusted by adjusting the moisture content and the temperature of the polysaccharide derivative selected from a group consisting of polysaccharide ethers and esters prior to dry-grinding.

9. The method according to claim 8, wherein the dry-grinding is conducted in a rotational dry-grinding device, and wherein the DOP (50,3) and the EQPC (50,3) of the particles after dry-grinding is adjusted by adjusting the circumferential speed of the dry-grinding device in addition to adjusting the moisture content and the temperature of the polysaccharide derivative prior to dry-grinding.

10. A hydraulic setting composition comprising a particulate polysaccharide derivative selected from a group consisting of polysaccharide ethers and esters, wherein the particulate polysaccharide derivative has a median particle diameter DOP (50,3) of at least 38 micrometers and a median particle diameter of the equivalent particle circle EQPC (50,3) of at least 80 micrometers.

11. The composition according to claim 10, wherein the composition is a mortar or plaster composition.

12. The composition according to claim 10 or 11, wherein the polysaccharide derivative is a cellulose derivative selected from a group consisting of polysaccharide ethers and esters.

* * * * *